United States Patent [19]

Morris

[11] 4,012,155

[45] Mar. 15, 1977

[54] SNAP LOCK CONNECTOR FOR COMPONENTS SUCH AS KNOCK-DOWN FURNITURE COMPONENTS

[76] Inventor: Max O. Morris, 582 E. Sunset Highway, Issaquah, Wash. 98027

[22] Filed: May 2, 1975

[21] Appl. No.: 574,017

[52] U.S. Cl. .............................. 403/290; 403/360; 46/29; 24/213 CS
[51] Int. Cl.² ........................................ F16B 21/06
[58] Field of Search .......... 403/289, 290, 297, 360, 403/375; 46/25, 28, 29; 24/213 CS, 213 R, 214, 208 A

[56] References Cited

UNITED STATES PATENTS

| 559,924 | 5/1896 | Arnold | 403/289 |
|---|---|---|---|
| 1,985,032 | 12/1934 | Hoult | 46/29 |
| 2,838,821 | 6/1958 | Shur | 24/217 |
| 2,855,206 | 10/1958 | Haviland | 403/375 X |
| 2,947,053 | 8/1960 | Sanderson | 24/217 |
| 3,169,292 | 2/1965 | Fenton | 24/213 R |
| 3,192,738 | 7/1965 | Charles et al. | 46/25 X |
| 3,210,820 | 10/1965 | Humiston | 24/214 X |

FOREIGN PATENTS OR APPLICATIONS

| 100,283 | 2/1937 | Australia | 46/25 |
|---|---|---|---|
| 1,176,422 | 11/1958 | France | 24/208 A |
| 983,015 | 2/1965 | United Kingdom | 24/208 A |
| 1,024,220 | 3/1966 | United Kingdom | 24/208 A |

*Primary Examiner*—Andrew V. Kundrat
*Attorney, Agent, or Firm*—Bell, Seltzer, Park & Gibson

[57] ABSTRACT

A snap lock connector for use in selectively connecting and disconnecting components, such as knock-down furniture components, and being characterized by a construction which provides locking with less force than unlocking, as follows. An elongate male member forms an extension from one of the components to be assembled and has a generally bulbous outer end defining leading and trailing camming surfaces thereon. A female member forms an internal passageway within the other of the components to be assembled and has an inwardly extending projection around at least a portion of the interior thereof defining leading and trailing camming surfaces. One of the male and female members is constructed for rendering that member flexible for expansion and contraction thereof during sliding engagement of the cooperating camming surfaces. The leading camming surface of one of the male and female members comprises a lesser included angle with respect to a longitudinal axis than the trailing camming surface for locking of the members with less force than unlocking. Whereby, the male member may be inserted into and withdrawn from the female member for locking and unlocking of the members by respective forced sliding engagement of the leading and trailing camming surfaces of the male and female members causing movement of the flexible member for allowing passage of the bulbous outer end of the male member past the projection in the female member.

7 Claims, 10 Drawing Figures

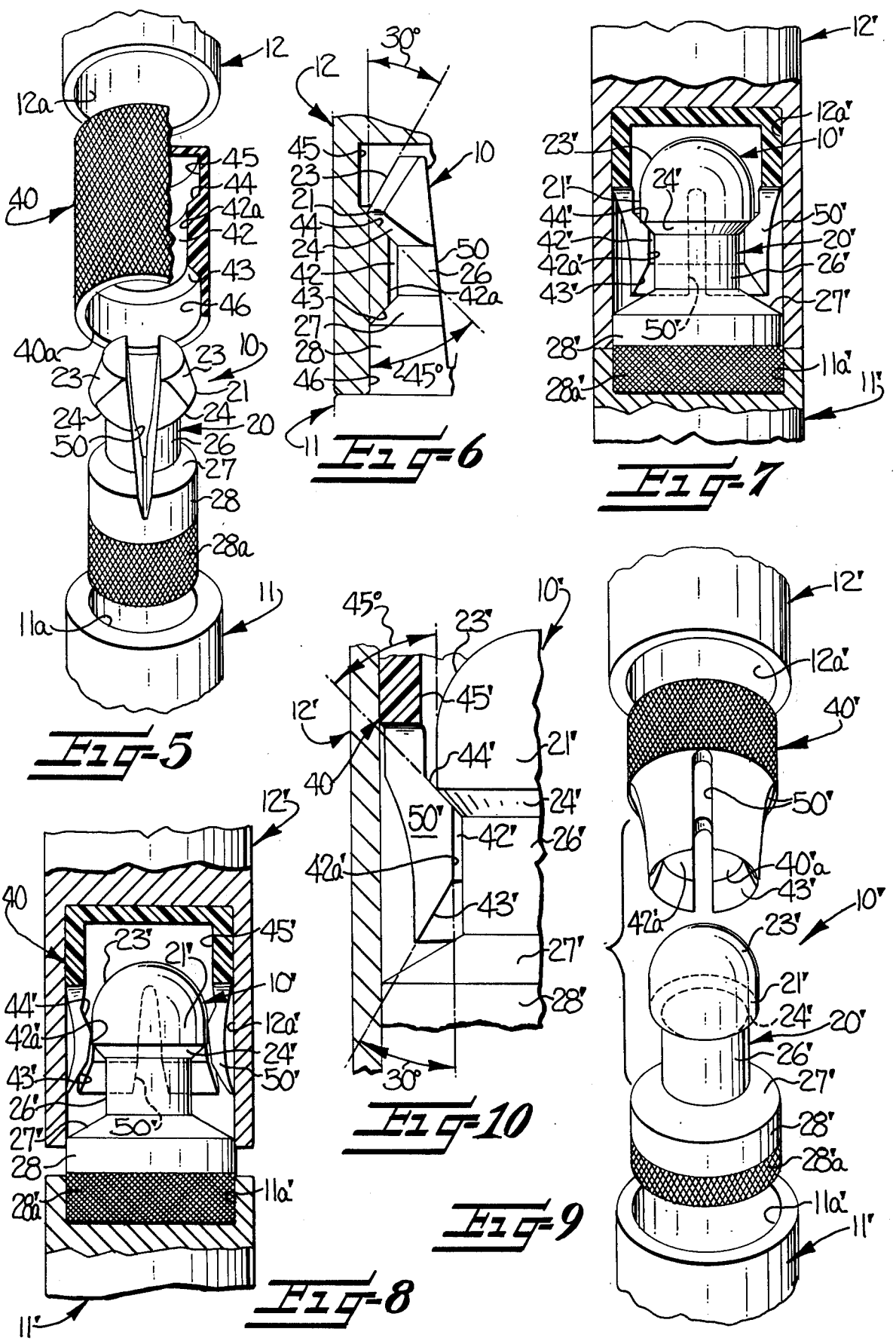

SNAP LOCK CONNECTOR FOR COMPONENTS SUCH AS KNOCK-DOWN FURNITURE COMPONENTS

This invention is directed to a snap lock connector for use in connecting and disconnecting components, such as knock-down furniture components, and is characterized by a construction which provides locking for connecting components with less force than unlocking for disconnecting components.

BACKGROUND OF THE INVENTION

In connecting components of various end products, in which the components are to be selectively assembled and disassembled, connectors are desirable between the components. This is particularly true in knock-down furniture which is becoming increasingly popular, for purposes of assembling the furniture components for normal use of the furniture and allowing disassembly of the components when storing or shipping of the furniture is desired.

Although a wide variety of connectors, including those which lock and unlock by snap fitting of one member into another member, have previously been proposed for various components, these previously proposed snap lock connectors have suffered from design deficiencies and lack of flexibility in their use.

For example, the previously proposed snap lock connectors have been complicated in design rendering them expensive to manufacture and have for the most part required the same amount of force for locking the members together for assembly of the components as for unlocking of the members for disassembly of the components. This has resulted in assembled components using such snap lock connectors which are too easily unlocked and disassembled when disassembly of the components is not desired. Additionally, the construction of these previously proposed snap lock connectors have not been suitable for fabrication from inexpensive materials and for mass production for producing inexpensive connectors for use in the industry.

Examples of such prior connectors are disclosed in the following United States Patents:

| Patent No. | Inventor | Issue Date |
|---|---|---|
| 3,195,266 | R. A. Onanian | July 20, 1965 |
| 3,520,082 | M. M. Smith | July 14, 1970 |
| 3,541,882 | R. Testa | November 24, 1970 |
| 3,605,201 | A. G. Peterson | September 20, 1971 |
| 3,648,404 | C. S. Ogsbury et al | March 14, 1972 |
| 3,653,146 | A. E. Goldfarb | April 4, 1972 |
| 3,674,229 | M. S. Keeler | July 4, 1972 |
| 3,687,092 | J. P. Manning | August 29, 1972 |
| 3,689,075 | L. Adelsohn | September 5, 1972 |
| 3,730,109 | W. J. Kreizel | May 1, 1973 |
| 3,759,623 | K. Hesse | September 18, 1973 |
| 3,826,206 | K. Ruggles | July 30, 1974 |

OBJECTS AND SUMMARY OF THE INVENTION

Accordingly, it is the object of this invention to provide a snap lock connector for use in selectively connecting and disconnecting of components, such as knock-down furniture components, which overcomes prior problems and is specifically constructed for providing locking for connecting components with less force than unlocking for disconnecting components.

It is a further object of this invention to provide such a snap lock connector which is constructed of relatively inexpensive materials, is uncomplicated in design, and may be mass produced.

It has been found by this invention that the above objects may be broadly accomplished by providing a snap lock connector, as follows.

An elongate male member forms an extension from one of the components to be assembled and has a generally bulbous outer end defining opposing, curved, oppositely and outwardly extending, leading and trailing, camming surfaces generally around at least a portion of the circumference thereof.

A female member forms an elongate, internal passageway within the other of the components to be assembled and has an inwardly extending projection around at least a portion of the interior of the passageway for restricting the dimensions of the passageway at that portion to less than the dimensions of the bulbous outer end of the male member. The projection defines opposing, curved, oppositely and inwardly extending, leading and trailing, camming surfaces for cooperating sliding engagement with the respective camming surfaces of the male member during locking and unlocking of the components.

One of the male and female members includes means for rendering the member flexible and resilient for expansion and contraction thereof during sliding engagement of the cooperating camming surfaces. The leading camming surface of at least one of the male and female members comprises a lesser included angle with respect to a longitudinal axis than the trailing camming surface for locking of the members with less force than unlocking of the members.

Whereby, the male member may be inserted into the female member for locking of the members by forced sliding engagement of the leading camming surfaces of the male and female members causing flexing movement of the flexible member for allowing passage of the bulbous outer end of the male member past the projection in the female member. The male member may be withdrawn from the female member for unlocking of the members by forced sliding engagement of the trailing camming surfaces of the male and female members causing flexing movement of the flexible member for allowing passage of the bulbous outer end of the male member past the projection in the passageway of the female member.

The male and female members may be shaped from and comprise integral portions of the components to be assembled, or they may comprise separate members adapted to be received and secured within bores of the components to be assembled.

Preferably, the male and female members are constructed of molded, high impact, plastic material for mass production to produce inexpensive connectors.

Further details of specific preferred embodiments of the present invention will be set forth in the detailed description to follow.

BRIEF DESCRIPTION OF THE DRAWINGS

Some of the objects and advantages of this invention having been set forth, other objects and advantages will appear as the description proceeds, when taken in conjunction with the accompanying drawings, in which:

FIG. 5 is an exploded perspective view of a variation of the first embodiment of the snap lock connector of this invention illustrating the members of the connector as separate members for being received and secured within bores of the furniture components to be assembled and disassembled;

FIG. 6 is a schematic view illustrating the angular relationships of the leading and trailing camming surfaces of the male member of the snap lock connector of this invention;

FIG. 7 is a cross-sectional, elevational view of a second embodiment of snap lock connector in accordance with this invention and illustrating the male and female members thereof in their assembled and locked condition;

FIG. 8 is a view like FIG. 7, but illustrating the male and female members in the relative positions thereof as the male member is being withdrawn from the female member for unlocking of the connector and disassembly of the furniture components;

FIG. 9 is an exploded perspective view of the second embodiment of snap lock connector in accordance with this invention illustrating the male and female members thereof as separate members for being received and secured within bores of the components of furniture to be assembled; and FIG. 10 is a schematic view illustrating the angular relationships of the leading and trailing camming surfaces of the female member.

DESCRIPTION OF PREFERRED EMBODIMENTS

Figure 1:
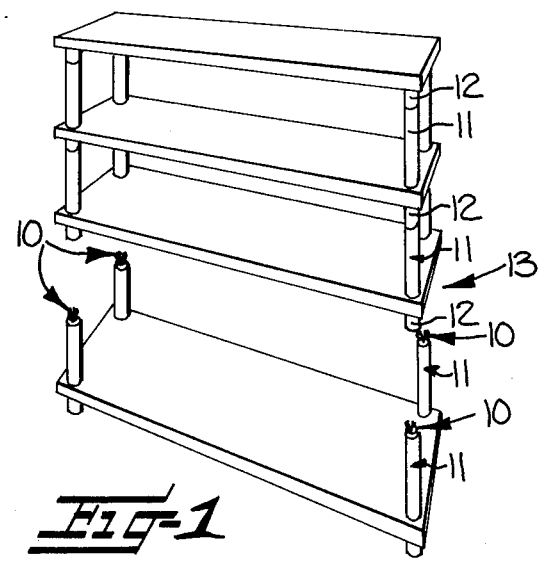
FIG. 1 is a perspective view of an item of furniture having knock-down components utilizing the snap lock connector of this invention and illustrating a portion of the item of furniture in disassembled condition and other portions of the item of furniture in assembled condition.

Referring now to the drawings, the snap lock connector of this invention is indicated generally at 10. The snap lock connector 10 may be utilized in connecting components, such as furniture components which, as illustrated in FIG. 1, are respective legs 11 and 12 of shelf components of a bookcase or other shelfed item of furniture 13. However, it is to be understood that the snap lock connector 10 of this invention may be utilized for connecting any knock-down furniture components or other components which are desired to be selectively assembled and disassembled, such as components of machinery including washing machines, dryers, etc.

A first embodiment with two variations is illustrated in FIGS. 1–6 of the drawings and will be described first. The twist lock connector 10 of the first embodiment comprises an elongate male member 20 for forming an extension from one of the components 11 of the item of furniture 13 to be assembled. The male member 20 has a generally bulbous shaped, outer end 21 which defines opposing, curved, oppositely and outwardly extending, leading and trailing, camming surfaces 23, 24 generally around at least a portion of the circumference thereof. As illustrated in the drawings, the top end and a portion of the sides of the bulbous outer end 21 are cut away for ease in fabrication and insertion thereof into the female member, to be described below. However, these cut-off surfaces could be eliminated and the bulbous outer end 21 could be circular in both tranvserse and longitudinal cross-section.

Figure 2:
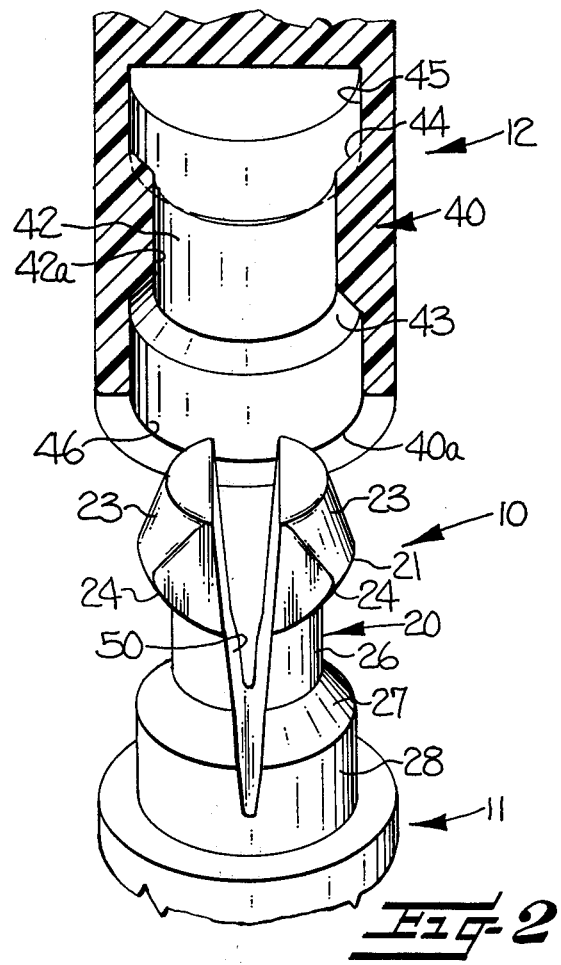
FIG. 2 is an enlarged, perspective view, partly in section, of the male and female members of a first embodiment of the snap lock connector of this invention and in which the members from integral portions of the components of the item of furniture to be assembled and illustrating the male and female members in their unlocked, disassembled condition.
Figure 3:
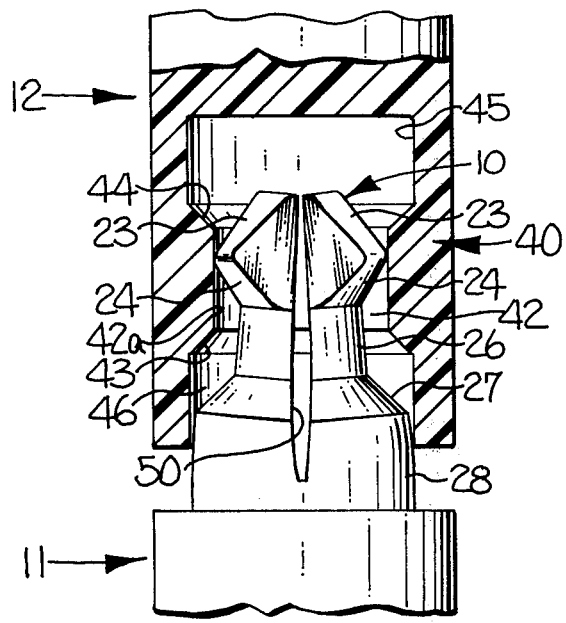
FIG. 3 is an elevational view, partly in section, of the members of the snap lock connector of this invention, shown in FIG. 2, illustrating the members being moved into their locked or assembled condition.
Figure 4:
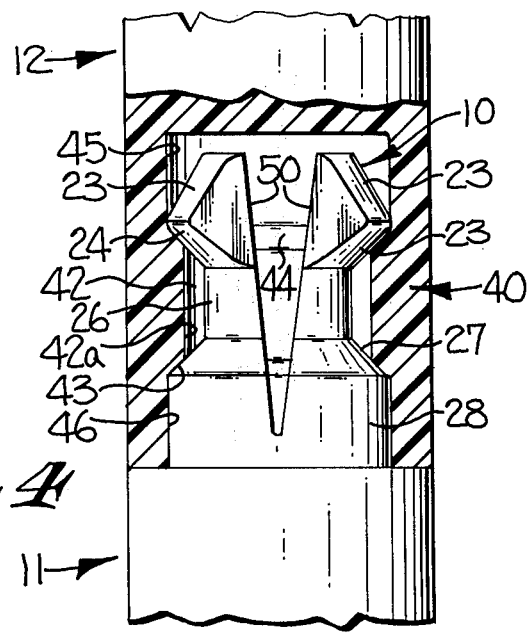
FIG. 4 is a view, like FIG. 3, illustrating the members of the snap lock connector after they have been moved into their locked and assembled condition.

The male member 20 of the snap lock connector 10 further includes an intermediate, generally cylindrical portion 26 of reduced transverse cross-sectional dimensions from said bulbous outer end and being of a predetermined longitudinal length, for purposes to be described below. The intermediate portion 26 merges into a shoulder surface portion 27 which forms a predetermined angle with respect to a longitudinal axis through the male member 20 and leads from the other, generally cylindrical shaped, end portion 28 of the male member 20. The other end portion may be integral with and formed from the component 11 of the articles of furniture 13 to be assembled, as illustrated in FIGS. 2–4, so that the male member 20 forms an integral extension from one of the components to be assembled. Or, the male member 20 may be formed as a separate elongate member in which the outer end portion 28 is adapted to be received and secured within a generally cylindrical bore 11a of the component 11 of the article of furniture 13 to be assembled. In the latter arrangement, at least a portion of the outside cylindrical surface of the end portion 28 of the male member 20 could include a roughened surface 28a (FIG. 5) formed by knurling, embossing, or the like, thereon for facilitating attachment by glueing or otherwise to the inside of the cylindrical bore 11a in the component 11 of the article of furniture 13 to be assembled.

The snap lock connector 10 further includes a female member 40 for forming an elongate, generally cylindrical, internal passageway 40a within the other of the components 12 of the article of furniture 13 to be assembled. The female member 40 has an inwardly extending projection 42 around at least a portion of the passageway 40a thereof for restricting the transverse dimensions of the passageway 40a at that position to less than the transverse dimensions of the bulbous outer end of the male member 20. The projection 42 of the female member 40 defines opposing, curved, oppositely and inwardly extending, leading and trailing, camming surfaces 43, 44. These leading and trailing camming surfaces 43, 44 defined by the projection 42 of the male member 40 may be spaced apart a distance corresponding to the longitudinal length of the inside surface 42a of the projection 42. The longitudinal dimension of the surface 42a of the projection 42 is preferably of a substantially equal length to the longitudinal dimension of the intermediate portion 26 of the male member 20, for purposes to be described below.

The passageway 40a of the female member 40 includes an inner portion 45 of sufficient longitudinal length and transverse width for accommodating the bulbous outer end portion 21 of the male member 20 when the male member 20 is inserted within the female member 40 and an outer portion 46 of sufficient longitudinal length and transverse width for accommodating the other end portion 28 of the male member 20 when the male member 20 is inserted within the female member 40 so that the components 11 and 12 of the article of furniture 13 to be assembled can be placed in abutting relationship with each other when the male member 20 is inserted within the female member 40 and result in the connector 19 being completely hidden within the components 11 and 12.

The female member 40 may comprise an integral passageway formed within the component 12 of the article of furniture 13 to be assembled, as illustrated in FIGS. 2-4, so as to be an integral part of the component 12. Or, the female member 40 may comprise a separate, elongate, generally cylindrical member adapted for being received and secured within a cylindrical bore 12a of the component 12 of the article of furniture 13 to be assembled, as shown in FIG. 5. If the female member 40 is a separate component, it may include a roughened outer surface, formed by knurling, embossing or the like, for aiding in securing the female member by glue or otherwise within the bore 12a of the components 12 of the article of furniture 13 to be assembled.

In the snap lock connector 10 of this invention, at least one of the male or female members 20, 40 includes means for rendering the member flexible and resilient for expansion and contraction thereof.

In the first embodiment of the snap lock connector 10, illustrated in FIGS. 2-6, this flexibility and resiliency is provided in the male member 20 by a generally wedge-shaped cut out 50 extending longitudinally from the outer bulbous end 21 into the male member 20. Also, the male member 20 is preferably formed of flexible, resilient material to allow flexible and resilient expansion and contraction of the bulbous outer end 21 of the male member 20 during insertion and removal thereof into and out of the female member 40. In the case where the male and female members 20, 40 are formed as separate members, as illustrated in FIG. 5, these members 20, 40 are both preferably constructed of molded, high impact, flexible and resilient, plastic material, such as styrene, which enables inexpensive mass production thereof for producing inexpensive snap lock connectors 10.

The leading camming surface 23, 43 of at least one of the male or female members 20, 40 comprises a lesser included angle with respect to a longitudinal axis than the trailing camming surfaces 24, 44 of the male and female members 20, 40 for locking of the members with less force than unlocking, to be explained more fully below.

In the first embodiment of snap lock connector 10, illustrated in FIGS. 2-6, the leading camming surface 23 of the male member 20 comprises a lesser included angle than the trailing camming surface 24 with respect to a longitudinal axis. It has been found in a commercial embodiment of this invention, as illustrated in FIG. 6, that the leading camming surface 23 of the male member 20 may be disposed at an included angle of 30° with respect to a longitudinal axis and the trailing camming surface 24 may be disposed at an included angle of 45° with respect to a longitudinal axis.

With the above described construction of the first embodiment of snap lock connector 10 (FIGS. 2-6) of this invention, the male member 20 may be inserted into the female member 40 for locking of the members 20, 40 and assembly of the components 11, 12 of the article of furniture 13 by forced sliding engagement of the leading camming surfaces 23, 43 of the male and female members 20, 40. This forced sliding engagement causes contraction of the bulbous outer end 21 of the male member 20, as shown in FIG. 3, due to the wedgeshaped cut out 50 in the male member 20 and the flexible, resilient material from which it is formed, so that the bulbous outer end 21 may move past the projection 42 in the passageway 40a of the female member 40. After the bulbous outer end 21 of the male member 20 has moved past the projection 42 of the female member 40, the bulbous outer end 21 will expand back to its original configuration and be contained and snap locked within the inner portion 45 of the female member 40. In view of the above-described dimensions of the intermediate portion 26 of the male member 20 and the surface 42a of the projection 42, the trailing camming surface 24 of the male member 20 will rest on the trailing camming surface 44 of the female member 40 and the shoulder surface 27 of the male member 20 will rest on the leading camming surface 43 of the female member 40 for stabilizing of the members 20, 40 in their locked condition, as shown in FIG. 4.

The male member 20 may be withdrawn from the female member 40 for unlocking of the snap lock connector 10 and disassembly of the components 11, 12 of the article of furniture 13 by forced sliding engagement of the trailing camming surfaces 24, 44 of the male and female members 20, 40 again causing flexible movement or contraction of the bulbous outer end 21 of the male member 20 for allowing passage of the bulbous outer end 21 past the projection 42 in the passageway 40a of the female member 40.

Inasmuch as the leading camming surface 23 of the male member 20 is of a lesser included angle, preferably 30°, with respect to a longitudinal axis than the trailing camming surface 24, preferably 45°, with respect to a longitudinal axis, it may be seen that the forced sliding movement of the leading camming surfaces 23, 43 of the male and female members 20, 40 may be more easily accomplished for locking of the members 20, 40 than when the trailing camming surfaces 24, 44 of the male and female members 20, 40 are engaged during unlocking of the members 20, 40 by withdrawing of the male member 20 from the female member 40.

Referring now to the second embodiment of snap lock connector, indicated at 10' and illustrated in FIGS. 7-10, like reference numerals with prime notations will be utilized in describing this embodiment where these elements are substantially the same as elements of the first embodiment of FIGS. 2-6. Reference may be had to the prior description for these like elements and a detailed description will not be given for this second embodiment where the elements are generally the same.

Although the bulbous outer end 21' of this second embodiment is illustrated as being of a slightly different configuration, it could be exactly the same configuration as the first embodiment and the first embodiment could utilize the configuration of the bulbous outer end 21' of the second embodiment. The bulbous outer end 21' also includes opposing, curved, oppositely and outwardly extending leading and trailing, camming surfaces 23', 24' around the circumference thereof. The remaining construction of the male member 20' of this embodiment is the same as the male member 20 of the first embodiment, except that the cut out 50 is eliminated.

The female member 40' of this second embodiment also includes a projection 42' which defines opposing, curved, oppositely and inwardly extending, leading and trailing, camming surfaces 43', 44'. In this second embodiment, the projection 42' is spaced from the wall of the bore 12a' of the component 12' of the article of furniture to be assembled and instead of the male member including a cut out therein, the female member includes cut outs 50' extending longitudinally through the projection 42' for rendering the female member flexible and resilient for expansion and contraction during sliding engagement of the cooperating camming surfaces 23', 24' and 43', 44' during locking and unlocking of the male and female members 20', 40'. As illustrated in FIGS. 7–10, a plurality of cut outs 50° is provided and it may be seen that more than one cut out 50 may also be utilized in the first embodiment of FIGS. 2–6.

In this second embodiment of FIGS. 7–10, the leading camming surface 43' of the female member 40' forms the lesser included angle, preferably 30°, with a longitudinal axis than the trailing camming surface 44', preferably 45°, with a longitudinal axis.

In this second embodiment of snap lock connector 10', the male member 20' may be inserted into and withdrawn from the female member 40' for locking of the members 20', 40' and assembly of the components 11', 12' of the article of furniture by forced sliding engagement of the leading camming surfaces 23', 43' of the male and female members 20', 40' and for unlocking by forced sliding engagement of the trailing camming surfaces 24', 44' of the male and female members 20', 40' causing flexible expansion of the projection 42' for allowing passage of the bulbous outer end 21' of the male member 20' thereby. Due to the above described angular relationship of the leading and trailing camming surfaces 43', 44' of the female member 40' with respect to a longitudinal axis, locking of the members 20', 40' may be effected with less force than unlocking of the members 20', 40', as described above.

The remaining relationships, functions and construction of this second embodiment of snap lock connector 10' are substantially the same as those described with respect to the first embodiment of the snap lock connector 10. Also, this second embodiment 10' of the snap lock connector may have the male and female members 20', 40' formed as integral portions of the furniture components 11', 12' or formed as separate components, as illustrated in FIGS. 7–10.

Thus, it may be seen, that this invention has provided a snap lock connector for use in connecting and disconnecting components, such as knock-down furniture components, in which two preferred embodiments with variations of each have been specifically described, and which are characterized by a construction which provides locking for connecting the members of the connector and the components of the article of furniture or the like being assembled with less force than unlocking for disconnecting and disassembly and which overcomes prior problems presented with previously proposed snap lock connectors.

In the drawings and specification, there have been set forth preferred embodiments of the invention, and although specific terms are employed, they are used in a generic and descriptive sense only and not for purposes of limitation.

What is claimed is:

1. A snap lock connector for use in connecting and disconnecting components, such as furniture components, and being characterized by a rigid construction which provides longitudinal stabilization of the components in the locked condition by preventing relative longitudinal movement or pivoting between the components; said connector comprising:

an elongate male member for forming an extension from one of the components to be assembled and having a generally bulbous outer end defining opposing, curved, oppositely and outwardly extending, leading and trailing, camming surfaces generally around at least a portion of the circumference thereof, a longitudinally extending intermediate portion extending from said trailing surface and being of smaller transverse cross-sectional dimensions than said bulbous outer end, and a generally non-flexible rear end portion extending longitudinally from said intermediate portion and being of a predetermined configuration having cross-sectional dimensions at least as large as said bulbous outer end;

a female member for forming an elongate, internal passageway within the other of the components to be assembled and having an inner portion of slightly larger dimensions than said bulbous outer end of said male member, and inwardly and longitudinally extending projection forming an intermediate portion for restricting the dimensions of said passageway at said intermediate portion to less than the dimensions of said bulbous outer end of said male member, and a longitudinally extending generally non-flexible outer portion of slightly larger dimensions than said bulbous outer end of said male member, and being of a predetermined configuration corresponding generally to the predetermined configuration of said rear end portion of said male member for snuggly receiving same when said members are in locking engagement, said projection defining opposing, curved, oppositely and inwardly extending, leading and trailing, camming surfaces;

one of said male and female members comprising flexible, resilient material and having a longitudinal cut-out partially therethrough for rendering a portion other than said generally non-flexible portion of said one member expandable and contractable; and said leading, camming surface of at least one of said male and female member comprising a lesser included angle with respect to a longitudinal axis than said trailing camming surface for locking of said members with less force than unlocking of said members;

whereby, said male member may be inserted into and withdrawn from said female member for locking of said members by forced sliding engagement of said leading camming surfaces and for unlocking by forced sliding engagement of said trailing camming surfaces of said male and female members causing flexible contraction of said expandable and contractable portion of said one member for allowing passage of said bulbous outer end of said male member past said projection in said intermediate portion of said female member, and so that, when said male member is inserted into said female member and is in locking engagement therewith, said trailing camming surface of said male member will be in engagement with said trailing camming surface of said female member and said generally nonflexible rear end portion of said male member will be snuggly received in said generally non-flexible outer portion of said female member of generally the same configuration for providing a rigid connection with longitudinal stabilization of said male and female members to prevent relative movement or pivoting between said members and thus the components being connected.

2. A snap lock connector, as set forth in claim 1, in which
said male member further includes a shoulder portion extending between said intermediate portion and said rear end portion of said male member, and
said intermediate portion of said male member and said projection forming said intermediate portion of said female member comprising complementary dimensions so that said shoulder portion of said male member will be forced into engagement with said leading camming surface of said female member when said male and female members are in locking engagement for aiding in providing the rigid, longitudinally stable connection between said members.

3. A snap lock connector, as set forth in claim 1, in which said one of said male and female members comprising flexible, resilient material and having a longitudinal cut-out therein for rendering said one member expandable and contractable comprises said male member having said longitudinal cut-out therein extending generally from and at least through said bulbous outer end thereof and being of generally wedge-shape configuration.

4. A snap lock connector, as set forth in claim 1, in which said leading camming surface of said at least one of said male and female members comprises an approximately 30° including angle with respect to the longitudinal axis and said trailing camming surface of said at least one of said male and female members comprises an included angle of approximately 45° with respect to a longitudinal axis.

5. A snap lock connector, as set forth in claim 1, in which said male member comprises an integral extension from the one of the components to be assembled and said female member comprises an integral passageway within the other of the components to be assembled.

6. A snap lock connector, as set forth in claim 1, in which said male member comprises a separate elongate member in which said rear end portion is further elongated for being received and secured within a bore of one of the components to be assembled and forming an extension therefrom, and said female member comprises a separate elongate member for being received and secured within a bore of the other of the components to be assembled.

7. A snap lock connector, as set forth in claim 1, in which said male and female members comprise molded, high impact, plastic material.

* * * * *

UNITED STATES PATENT AND TRADEMARK OFFICE
CERTIFICATE OF CORRECTION

PATENT NO. : 4,012,155
DATED : March 15, 1977
INVENTOR(S) : Max O. Morris

It is certified that error appears in the above-identified patent and that said Letters Patent are hereby corrected as shown below:

Column 3, line 7, "from" should be --form--.

Column 4, Line 23, "articles" should be --article--.

Column 4, Line 45, "position" should be --portion--.

Column 5, Line 4, "19" should be --10--.

Column 5, Line 19, "components" should be --component--.

Column 6, Line 2, "wedgeshaped" should be --wedge-shaped--.

Column 7, Line 13, "50°" should be --50'--.

Column 8, Line 25, "and" should be --an--.

Column 8, Line 48, "member" should be --members--.
Column 10, line 6, "including" to read --- included ---.

Signed and Sealed this

Twenty-first Day of June 1977

[SEAL]

Attest:

RUTH C. MASON
*Attesting Officer*

C. MARSHALL DANN
*Commissioner of Patents and Trademarks*